United States Patent [19]
Volaski

[11] Patent Number: 5,638,630
[45] Date of Patent: Jun. 17, 1997

[54] FISHING LURE WITH A HOLLOW TRANSPARENT BODY FOR SUPPORTING LIVE BAIT

[76] Inventor: Bruce M. Volaski, 9704 Road 256, Terra Bella, Calif. 93270

[21] Appl. No.: 603,079

[22] Filed: Feb. 20, 1996

[51] Int. Cl.⁶ .................................................. A01K 85/00
[52] U.S. Cl. .................................. 43/41; 43/44.99
[58] Field of Search .................. 43/41, 42.06, 42.33, 43/42.22, 42.35

[56] References Cited

U.S. PATENT DOCUMENTS

| | | | |
|---|---|---|---|
| 1,993,798 | 3/1935 | Peterson | 43/42.32 |
| 2,112,385 | 3/1938 | Smith | 43/42.35 |
| 2,791,058 | 5/1957 | Bettini | 43/42.06 |
| 2,793,459 | 5/1957 | Multanen | 43/41 |
| 3,863,380 | 2/1975 | Purlia | 43/42.35 |
| 5,177,891 | 1/1993 | Holt | 43/17.1 |
| 5,355,613 | 10/1994 | Kechriotis | 43/42.22 |

*Primary Examiner*—Jeanne Elpel

[57] ABSTRACT

A fishing lure with a hollow transparent body is disclosed. A cylindrical body is formed of a transparent plastic material having an upper extent and a lower extent with a first end and a second end tapering down to a point adjacent to the lower extent. The body has a hollow interior generally conforming to its exterior configuration. Screw threads are formed in the interior adjacent to the first end. A cap is provided having a forward end and a rearward end, the forward end being formed with a cylindrical extension having screw threads adapted to releasably couple with the screw threads of the body. The rearward end of the cap tapers downwardly to form a lower extension of the cylindrical extension of the cap. The lower extension having a flat bottom surface and a concave upper surface defining a spoon shape.

1 Claim, 2 Drawing Sheets

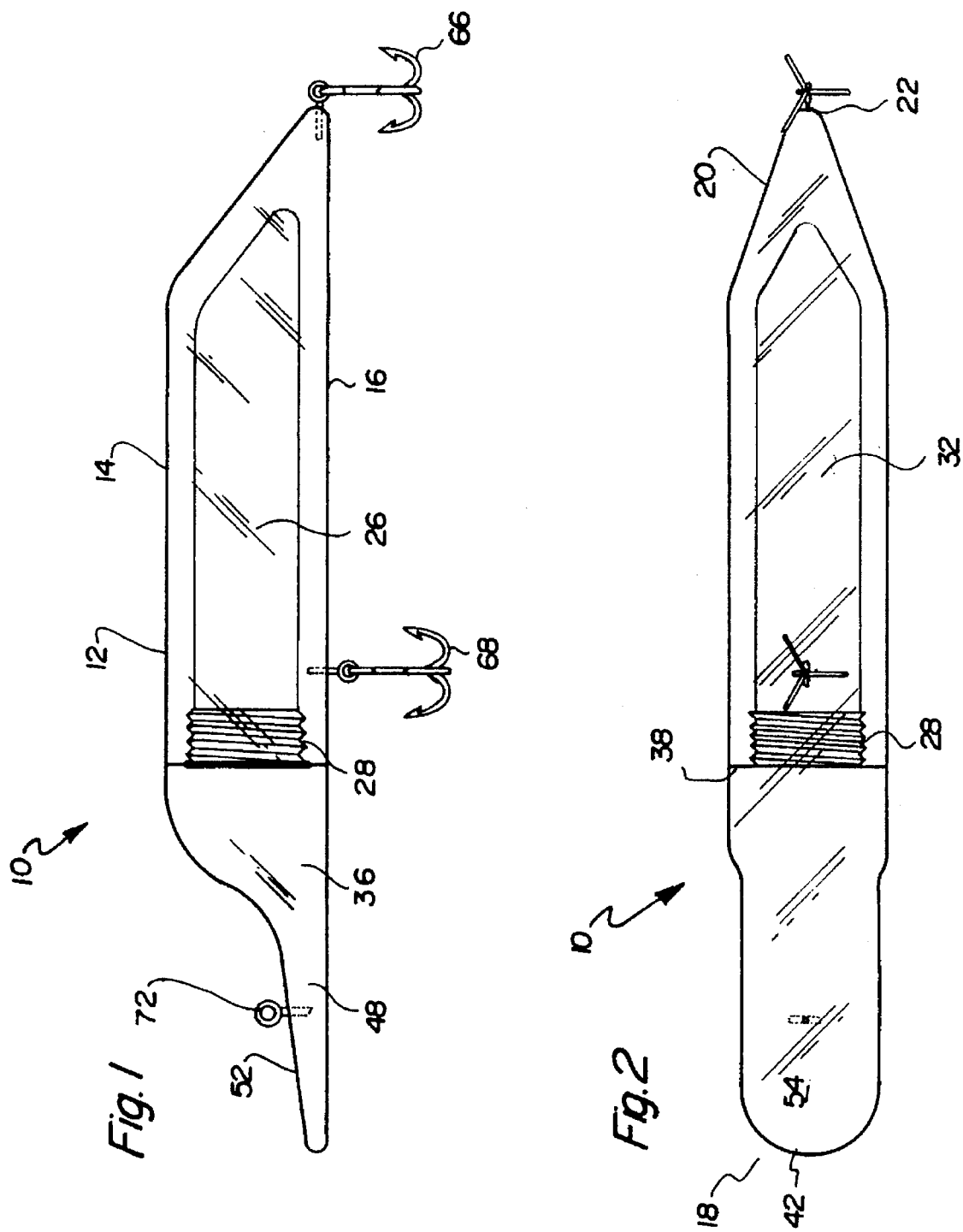

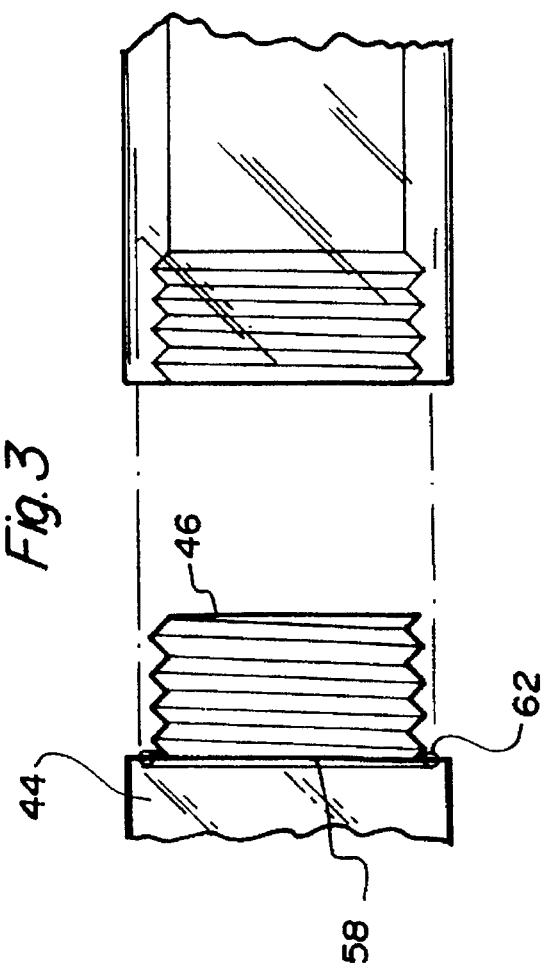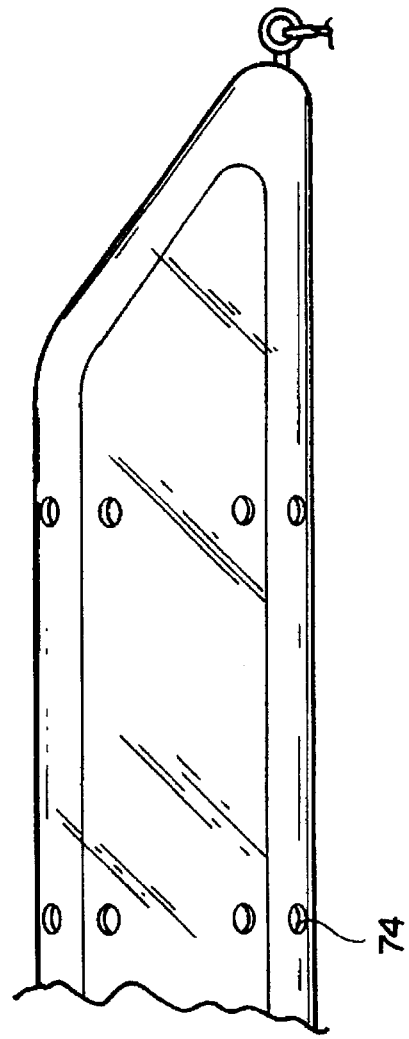

FISHING LURE WITH A HOLLOW TRANSPARENT BODY FOR SUPPORTING LIVE BAIT

BACKGROUND OF THE INVENTION

1. Field of the Invention

The present invention relates to a new and improved fishing lure with a hollow transparent body for supporting live bait and, more particularly, pertains to supporting live bait to attract game fish.

2. Description of the Prior Art

The use of fishing lures is known in the prior art. More specifically, fishing lures heretofore devised and utilized for the purpose of attracting fish through lures of various designs and configurations are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,869,014 to Francklyn discloses an adjustable bait-receiving fishing lure. U.S. Pat. No. 4,067,135 to Martin discloses a fishing lure and bait therefor. U.S. Pat. No. 3,844,060 to Kurachi discloses a live bait fishing lure. U.S. Pat. No. 5,301,452 to Roach discloses a bait-carrying hook and lure. Lastly, U.S. Pat. No. 5,319,875 to Brandolino discloses a cage lure.

While these devices fulfill their respective, particular objectives and requirements, the aforementioned patents do not describe a fishing lure with a hollow transparent body for supporting live bait that allows an increase in the appeal of lures to fish thought to be caught through various methods and apparatuses.

In this respect, the fishing lure with a hollow transparent body for supporting live bait according to the present invention substantially departs from the conventional concepts and designs of the prior art, and in doing so provides an apparatus primarily developed for the purpose of supporting live bait to attract game fish.

Therefore, it can be appreciated that there exists a continuing need for a new and improved fishing lure with a hollow transparent body for supporting live bait which can be used for supporting live bait to attract game fish. In this regard, the present invention substantially fulfills this need.

SUMMARY OF THE INVENTION

In view of the foregoing disadvantages inherent in the known types of fishing lures now present in the prior art, the present invention provides a new and improved fishing lure with a hollow transparent body for supporting live bait. As such, the general purpose of the present invention, which will be described subsequently in greater detail, is to provide a new and improved fishing lure with a hollow transparent body for supporting live bait and methods which have all the advantages of the prior art and none of the disadvantages.

To attain this, the present invention essentially comprises a new and improved fishing lure with a hollow transparent body for supporting live bait comprising, in combination, a cylindrical body formed of a transparent plastic material, the body having an upper extent and a lower extent with a first end and a second end tapering down to a point adjacent to the lower extent, the body having a hollow interior generally conforming to its exterior configuration, screw threads formed in the interior adjacent to the first end thereby defining a chamber between about four and six times longer than the diameter; a cap having a forward end and a rearward end, the forward end being formed with a cylindrical extension having screw threads adapted to releasably couple with the screw threads of the body, the rearward end of the cap tapering downwardly to form a lower extension of the cylindrical extension of the cap, said lower extension having a flat bottom surface and a concave upper surface defining a spoon shape; an annular recess formed in the forward end of the cap radially exterior of the extension with an O-ring located within the recess for resting purposes; and a pair of treble hooks secured to the housing, one secured to the second end of the housing and one secured to the lower surface of the body adjacent to the first end.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fishing lure with a hollow transparent body for supporting live bait which has all the advantages of the prior art fishing lures and none of the disadvantages.

It is another object of the present invention to provide a new and improved fishing lure with a hollow transparent body for supporting live bait which may be easily and efficiently manufactured and marketed.

It is a further object of the present invention to provide a new and improved fishing lure with a hollow transparent body for supporting live bait which is of a durable and reliable construction.

An even further object of the present invention is to provide a new and improved fishing lure with a hollow transparent body for supporting live bait which is susceptible of a low cost of manufacture with regard to both materials and labor, and which accordingly is then susceptible of low prices of sale to the consuming public, thereby making such a fishing lure with a hollow transparent body for supporting live bait economically available to the buying public.

Even still another object of the present invention is to support live bait to attract game fish.

Lastly, it is an object of the present invention to provide a fishing lure with a hollow transparent body. A cylindrical body is formed of a transparent plastic material having an upper extent and a lower extent with a first end and a second end tapering down to a point adjacent to the lower extent.

The body has a hollow interior generally conforming to its exterior configuration. Screw threads are formed in the interior adjacent to the first end. A cap is provided having a forward end and a rearward end, the forward end being formed with a cylindrical extension having screw threads adapted to releasably couple with the screw threads of the body. The rearward end of the cap tapers downwardly to form a lower extension of the cylindrical extension of the cap. The lower extension having a flat bottom surface and a concave upper surface defining a spoon shape.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of the preferred embodiment of the fishing lure with a hollow transparent body for supporting live bait constructed in accordance with the principles of the present invention.

FIG. 2 is a top elevational view of the device shown in FIG. 1.

FIG. 3 is an exploded side elevational view of the area of coupling between the two components of the device shown in FIGS. 1 and 2.

FIG. 4 is a side elevational view similar to FIG. 1 but illustrating an alternate embodiment of the invention.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved fishing lure with a hollow transparent body for supporting live bait embodying the principles and concepts of the present invention and generally designated by the reference numeral 10 will be described.

The present invention, the new and improved fishing lure with a hollow transparent body for supporting live bait is a system 10 comprised of a plurality of components. Such components, in their broadest context, include a cylindrical body, a cap, a pair of hooks, an eyelet and a plurality of holes. Each of the individual components is specifically configured and correlated one with respect to the other so as to attain the desired objectives.

The present invention may be construed as a system 10. The central component of the system is a cylindrical body 12. Such body is formed of a transparent plastic material which is rigid to retain its shape during normal operation and use. The body is formed to have an upper extent 14 and a lower extent 16. Such extents define a first end 18 and a second end 20. The second end 20 tapers down to a point 22. Such point is located adjacent to the lower extent.

The body is also formed to have a hollow interior 26. Such interior generally conforms to its exterior configuration of the body. Screw threads 28 are formed in the interior adjacent to the first end. This thereby defines a chamber 32. The chamber is between about four and six times longer than its diameter.

The second major component of the system 10 is a cap 36. The cap is formed to have a forward end 38 and a rearward end 42. The forward end is formed with a cylindrical extension 44. The cylindrical extension has screw threads 46. Such screw threads are adapted to releasably couple with the screw threads of the body. The rearward end of the cap tapers downwardly to form a lower extension 48 of the cylindrical extension of the cap. The lower extension having a flat bottom surface and a concave upper surface 52 defining a spoon shape 54.

A sealing arrangement between the body and the cap is effected through the formation of an annular recess 58. Such recess is formed in the forward end of the cap. It is located radially exterior of the extension. Within the recess there is located a removable O-ring 62. The O-ring functions between the body and cap to form a sealing relationship therebetween.

Next provided is a pair of treble hooks. Such treble hooks are threadedly secured to the housing. One of the treble hooks 66 is secured to the second end of the body and extends forwardly thereof. The other treble hook 68 is secured to the lower surface of the body in a location adjacent to the first end.

Lastly provided is an eyelet 72. The eyelet is threadedly secured to the upper surface of the cap. It is located adjacent to the rearward end of the cap. This allows the coupling of the lure to a line and then to a fishing rod during operation and use. An alternate embodiment of the invention is shown in FIG. 4. According to such alternate embodiment, a plurality of holes 74 is formed in the body. They are adapted to extend through the body in a plurality of circular configurations. Such holes permit the flow of water between exterior of the body and the chamber.

The present invention is a fishing lure that is extremely versatile, because the live bait can be varied to attract a particular type of fish. The lure is made of transparent plastic, with a cylindrical body of about 1-inch in diameter and is 3½ inches long. A ¾-inch diameter hole extends longitudinally into the plug from the back end of the bait, and is held in place with a threaded plug and an elastomeric O-ring seal that fits into a groove. There are also two treble hooks located on the lure. In use, the bait is placed inside of the lure and is clearly visible to attract the fish. No matter how many casts and strikes are made, the bait is never lost, and attaching live bait to hooks is no longer required. The present invention permits the angler to exercise his or her own ingenuity, challenging him or her to develop a lure that works best for that day, that place, and the type of fish in that particular body of water. This applies to streams, ponds, and lakes and may be extended to salt water as well.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved fishing lure with a hollow transparent body for supporting live bait comprising, in combination:

a cylindrical body formed of a transparent rigid plastic material, the body having an upper extent and a lower extent with a first end and a second end tapering down to a point adjacent to the lower extent, the body having a hollow interior conforming to its exterior configuration, screw threads formed in the interior adjacent to the first end thereby defining a chamber between about four and six times longer than the diameter, wherein the body has a length of approximately 3½ inches;

a cap having a forward end and a rearward end, the forward end being formed with a cylindrical extension having screw threads adapted to releasably couple with the screw threads of the body, the rearward end of the cap tapering downwardly to form a lower extension of the cylindrical extension of the cap, said lower extension having a flat bottom surface and a concave upper surface defining a spoon shape;

an annular recess formed in the forward end of the cap radially exterior of the extension with an O-ring located within the recess for resting purposes;

a pair of treble hooks secured to the body, one secured to the second end of the body and one secured to the lower surface of the body adjacent to the first end;

an eyelet threadedly secured to the upper surface of the cap adjacent the rearward end thereof allowing the coupling of the lure to a line and then to a fishing rod during operation and use; and a plurality of holes formed in the body and extending through the body in a plurality of circular configurations for permitting the flow of water between an exterior of the body and the interior.

* * * * *